Jan. 24, 1961 R. R. WENTZEL 2,969,053
TEETH FOR RECIPROCATING STONE CUTTING SAW BLADE
Filed March 6, 1959
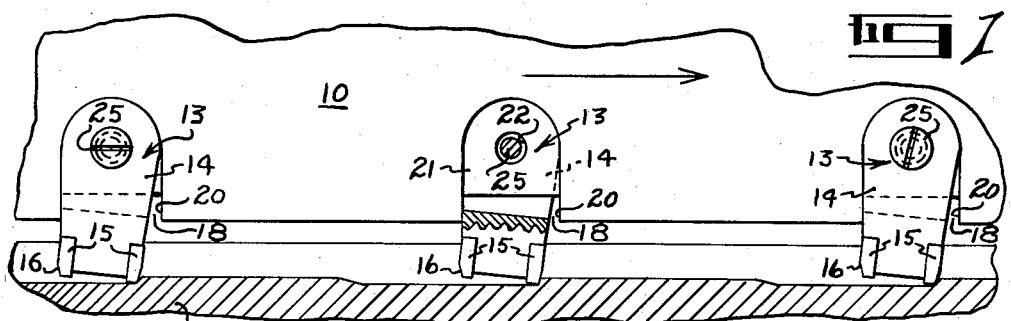
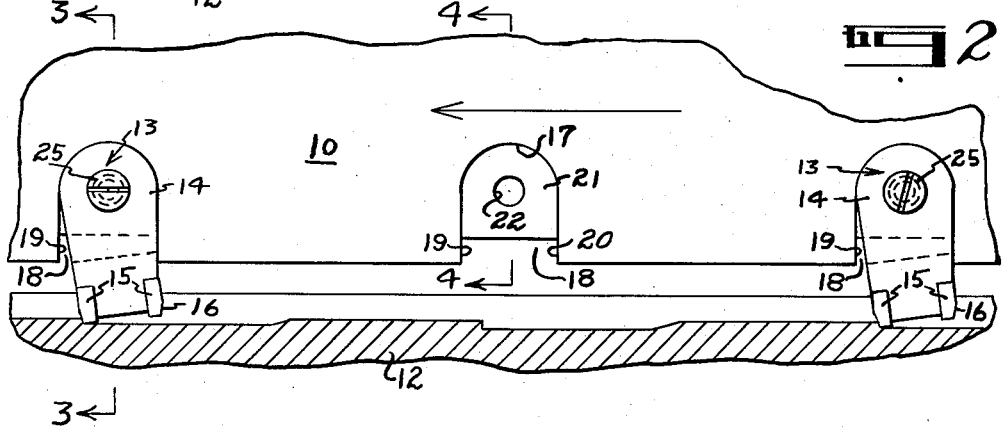
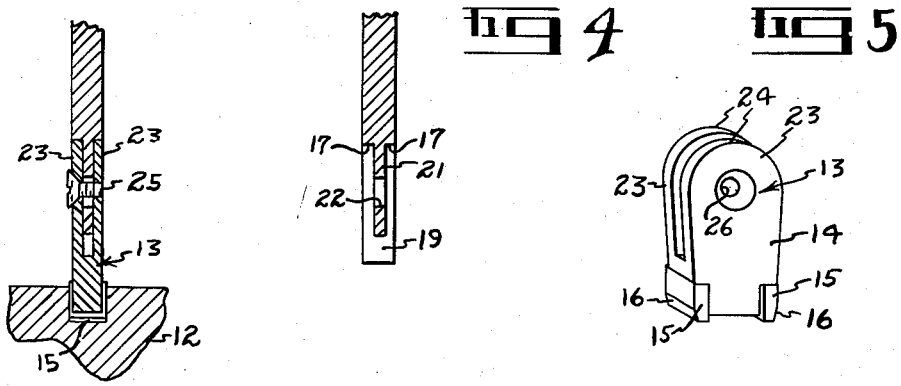
INVENTOR.
Richard R. Wentzel
BY Jennings, Carter & Thompson
Attorneys

United States Patent Office 2,969,053
Patented Jan. 24, 1961

2,969,053

TEETH FOR RECIPROCATING STONE CUTTING SAW BLADE

Richard R. Wentzel, Trussville, Ala., assignor to Wentzel Carbide Tool Company, Inc., a corporation of Alabama Filed Mar. 6, 1959, Ser. No. 797,730

4 Claims. (Cl. 125—22)

This application is a continuation-in-part application of my copending application Serial No. 696,128, filed November 13, 1957, now abandoned.

This invention relates to teeth for a reciprocating stone cutting saw blade and more particularly to teeth adapted for rocking relative to the saw blade with cutting surfaces on opposite edges of the teeth alternately rocking into and out of cutting engagement with the stone.

It is an object of the present invention to provide teeth for a reciprocating saw blade that are positioned within notches along the working edge of the saw blade for rocking movement relative to the saw blade and which transmit forces and stress from the cutting action through the surfaces of the saw blade defining the notches.

It is a further object of my invention to provide teeth for a reciprocating saw blade in which the teeth are bifurcated and fitted over ribs in the notches of the saw blade with pins mounting the teeth loosely on the ribs for rocking movement relative to the saw blade so that force from the cutting action is not transmitted through the pins.

An additional object of my invention is to provide teeth for a reciprocating saw blade that are of a thickness substantially the same as the thickness of the saw blade and which have cutting tips extending beyond the extent of the saw blade sides so that a cut greater than the thickness of the saw blade is taken by the cutting tips thereby decreasing frictional contact between the saw blade and the material being cut.

My invention comprises teeth having bifurcated ends that fit over ribs in the notched working edge of a reciprocating saw blade. The distance between the edges defining the notches is greater than the width of the saw teeth positioned in the notches to allow rocking movement of the saw teeth with the surfaces defining the notches adapted to abut the edges of the saw teeth and limit the rocking movement thereof. The inner ends of the teeth are arcuate and contact the surfaces defining the inner ends of the notches while pins retain the teeth loosely on ribs in the notches. Thus, force or stress exerted by contact of the teeth with the stone is transmitted by the edges of the teeth through the surfaces defining the notches in which the teeth are positioned, and no force is exerted through the loose pin connections. The thickness of the teeth is substantially the same as the thickness of the saw blades which eliminates abrasive action of cuttings or stone particles against the sides of the teeth. Cutting tips are provided on opposite edges of the saw teeth which extend laterally beyond the sides of the teeth and the saw blade so that a cut greater than the thickness of the saw blade is taken by the cutting tips thereby decreasing frictional contact between the stone and the saw blade and saw teeth.

The term "stone" as used in the specification and claims herein includes marble, concrete, limestone, limerock, granite, sand stone, quartz, terrazzo, and other similar materials. However, it is understood that the present invention is not limited in use to the above materials and includes its use on any materials to which it may be adapted.

Apparatus embodying features of my invention is illustrated in the accompanying drawings forming a part of this application, in which:

Fig. 1 is a side elevational view of my invention showing the forward stroke of a reciprocating saw blade in cutting engagement with a work piece, a portion of one saw tooth being cut away;

Fig. 2 is a side elevational view of the invention shown in Fig. 1 showing the rearward stroke of the saw blade in cutting engagement with the work piece and with one saw tooth being removed;

Fig. 3 is a cross sectional view taken generally along the line 3—3 of Fig. 2;

Fig. 4 is a sectional view taken generally along the line 4—4 of Fig. 2; and,

Fig. 5 is a perspective view of a typical saw tooth shown in Figs. 1 to 3.

Referring now in detail to the drawing for a better understanding of my invention, I show in Figs. 1 and 2 a tooth supporting saw blade 10 which is adapted for arrangement in a suitable saw frame (not shown) preferably having a plurality of saw blades mounted therein. Saw blade 10 is reciprocated by means of a suitable mechanism in any desired stone cutting machine.

A work piece consisting of a stone block 12 is shown beneath saw blade 10 and a plurality of saw teeth 13 are individually spaced at intervals along an outer, lower working edge of saw blade 10. The saw teeth 13 are mounted along saw blade 10 at intervals less than the stroke thereof so that a full cut is taken by each of the teeth 13. Saw teeth 13 comprise a main body portion 14 having a tip 15 of hard material secured to each of the forwardly facing and rearwardly facing edges of saw teeth 13 by suitable securing means, such as by brazing. A cutting surface 16 is arranged on the forward and rear edges of saw teeth 13. As shown, the cutting edges are rearwardly inclined with respect to the cutting surface when in cutting engagement with the stone. Thus, a "negative rake" is obtained by the cutting edges 16 in cutting engagement with the stone. The tips 15 may be formed of a material considerably harder than the body portion 14 and may preferably be made of a tungsten carbide material such as NC-3 carbide, style 1080, manufactured by Newcomer Products, Inc., Catalogue No. N-57, copyrighted 1956.

Blade 10 is provided with notches 18 which receive saw teeth 13. Notches 18 are defined by oppositely facing side edges 19 and 20 spaced from each other a distance greater than the width of the body portion 14, and by arcuate end edges so as to allow rocking movement of saw teeth 13 within notches 18 substantially in the cutting plane of the saw.

As further shown in Fig. 3, a rib 21 extends downwardly in notches 18 and is arranged centrally therein. Rib 21 is of a thickness approximately one-third of the thickness of blade 10 and is provided with an opening or aperture 22 extending therethrough so that the saw teeth 13 can be retained there on.

The saw teeth 13 are provided with bifurcated upper ends 23 which have arcuate end surfaces 24 that contact end edges 17. Ends 23 fit over rib 21 and an opening 26 is provided in teeth 13 through which a threaded pin or screw 25 extends. The diameter of screw 25 and opening 26 is considerably less than the diameter of opening 22, thus teeth 13 are loosely mounted on ribs 21. Screw 25 does not engage the surfaces defining opening 22 in working position and force exerted by the cutting action of the teeth 13 against the stone is not transmitted through pin 25. The saw teeth 13 rock relative to the working edge of saw blade 10 with edges 17 supporting teeth 13 during the rocking movement at the end of the saw blade strokes.

The side edges 19 and 20 defining notches 18 act as stops for limiting the rocking movement of saw teeth 13 and are adapted to abut the edges of body portions 14. The edges defining the notches and the edges of the teeth contacting the edges of the notches may be hardened if desired. Thus, as shown in Fig. 1, when the saw blade 10 is in its forward stroke saw teeth 13 abut edges 19 and are limited in rocking movement thereby. On the rearward stroke of saw blade 10 as shown in Fig. 2, saw teeth 13 abut edges 20 and are likewise limited thereby. Substantially the entire force exerted by the cutting action between teeth 13 and work piece 12 is transmitted through the edges of the teeth to side edges 19 and 20 and arcuate end edges 17 of notches 18.

Tips 15 extend beyond the sides and lower end of body portion 14 so that only the tips 15 are in frictional contact with the stone. The tips 15 also extend beyond the sides of blade 10 and thus no part of the body portion 14 or blade 10 normally contacts the stone.

While I have shown a pin connection in the drawings to mount or retain the teeth 13 on ribs 21, other suitable means may be employed to secure teeth 13. I have found that the bifurcated ends 23 may be pressed toward each other slightly and teeth 13 may be "snapped" over ribs 21 and be retained thereon by the resilience or "spring action" of the bifurcated ends 23 without the use of pins or other connections.

While it is important that the saw teeth 13 rock relatively to the saw blade 10 and in substantially the same plane as the cutting plane of the saw, the amount or degree of rocking need be only sufficient for moving the inactive or trailing cutting surface out of cutting engagement with the work piece 12 so that the inactive cutting surface will not drag or be in frictional contact with the work 12. Therefore, the predetermined amount of rocking may be varied with the working conditions.

From the foregoing, it will be understood that in the forward stroke of saw blade 10 as shown in Fig. 1, the forward facing cutting surfaces 16 are in cutting engagement with the top surface of the work piece 12 while the rear cutting surfaces 16 are removed from contact with the surface of the stone block 12. Upon the reciprocating saw blade 10 reaching the end of its forward stroke, the beginning of the rearward stroke rocks the saw teeth 13 from the position shown in Fig. 1 to the position shown in Fig. 2, in which the saw teeth 13 abut the side edges 20 and are restrained thereby. In this position, the rear cutting surfaces 16 engage in cutting relation the top surface of work 12, while the forward cutting surfaces 16 are removed from cutting contact. Thus, the cutting surfaces are alternately rocked into and out of cutting engagement with work piece 12 at the beginning of successive saw blade strokes. The saw teeth are bifurcated and fitted on the ribs loosely so that no shear is exerted against the pin connections of the teeth. Substantially the entire force of the cutting action is transmitted through the edges of the teeth and the contacting surfaces of the notches in which the teeth are positioned.

Although the invention has been disclosed as used in the cutting of stone primarily, it is understood that the principles of my invention may effectively be used for cutting metals and other material.

While I have shown my invention in but one form, it will be obvious to persons skilled in the art that it is not so limited but is susceptible of various changes and modifications without departing from the spirit thereof, and I desire, therefore, that only such limitations be placed thereupon as are specifically set forth in the appended claims.

What I claim is:

1. In a reciprocating saw blade adapted to cut stone on both the forward and rearward strokes thereof and having a notch on the outer working edge thereof, a rib positioned in said notch intermediate the thickness of said blade and being of a thickness substantially smaller than the thickness of the saw blade, a bifurcated saw tooth fitting over the rib and extending outwardly from the working edge of the saw blade, said saw tooth being of a thickness substantially the same as said saw blade, cutting surfaces on opposite edges of the saw tooth engaging the stone alternately upon reciprocation of the saw blade, and the spacing between the side edges of the blade defining the notch being greater than the width of the saw tooth therebetween to allow rocking movement of the saw tooth in said notch, the side edges defining the notch extending in a direction generally perpendicular to the direction of travel of the reciprocating saw blade and adapted to abut the side edges of the saw tooth and limit rocking movement thereof and the inner end edge of the saw tooth engaging the surface defining the inner end of said notch in supporting relation.

2. In a reciprocating saw blade for effecting the cutting of stone on both the forward and rearward strokes thereof and having a notch on the outer working edge thereof, a saw tooth disposed within said notch and extending from the outer working edge of said saw blade, cutting surface on opposite side edges of the tooth engaging the stone alternately in cutting relation upon reciprocation of the saw blade, a rib positioned in said notch centrally of the thickness of said blade, said rib being of a thickness substantially less than the thickness of the saw blade, said saw tooth being of a thickness substantially the same as said saw blade and bifurcated at its inner end to fit over said rib, the spacing between the side edges of the blade defining the notch being greater than the width of the saw tooth therebetween to allow limited rocking movement of the saw tooth in said notch, generally parallel side edges defining the notch on each side of said rib and extending in a direction generally perpendicular to the direction of travel of the reciprocating saw blade to abut the edges of the saw tooth and limit rocking movement thereof, the inner end edge of said tooth engaging the surface defining the inner end of said notch in supporting relation, and means loosely mounting said tooth on said rib for limited rocking movement whereby force exerted by contact of the tooth with the stone is transmitted by the edges of said tooth to said saw blade.

3. In a stone cutting saw having a reciprocating tooth supporting saw blade for effecting the cutting of stone on both the forward and rearward strokes of the saw blade, a plurality of saw teeth extending from the outer working edge of said saw blade, said outer edge being notched at intervals less than the stroke of said saw blade and receiving the saw teeth therein, ribs positioned in the notches intermediate the thickness of said blade, said ribs being of a thickness substantially less than the thickness of the saw blade, said saw teeth being bifurcated adjacent the inner ends thereof and fitting over said ribs, the spacing between the side edges defining the notches of the saw blade being greater than the width of the saw teeth positioned therebetween to allow limited rocking movement of the saw teeth in said notches, generally parallel side edges defining the notches extending in a direction generally perpendicular to the direction of travel of the reciprocating saw blade and abutting the edges of the saw teeth for limiting rocking movement thereof, the surfaces defining the inner end portions of the notches adjacent the ribs being arcuate and the inner ends of said teeth being arcuate and contacting the arcuate surfaces defining said notches, cutting surfaces on the forward and rear edges of the teeth, and means loosely mounting said teeth on said ribs for limited rocking movement whereby force exerted by contact of the teeth with the stone is transmitted by the edges of said teeth to said saw blade.

4. In a stone cutting saw, a tooth supporting reciprocating saw blade for effecting the cutting of stone on both the forward and rearward strokes of said saw blade, at least one saw tooth extending from an outer edge of said saw blade and adapted for limited rocking movement relative to said outer edge, cutting surfaces on the forward and rear edges of the tooth, said outer edge having a notch therein and a downwardly extending rib in said notch, said saw tooth being bifurcated at its upper end and fitting over the rib, generally parallel side edges defining the notch on each side of the rib and extending in a direction generally perpendicular to the direction of travel of the reciprocating saw blade to abut the side edges of saw tooth and limit rocking movement thereof, the inner end of said tooth engaging the surface defining the inner end of said notch in supporting relation, said saw tooth having a body portion of substantially the same thickness as the saw blade and a hard cutting tip secured to said body portion at the forward and rear edges thereof, said cutting tips extending laterally of the sides of the body portion and the saw blade thereby minimizing frictional contact between the stone and the saw blade, and means loosely mounting the tooth on the rib for limited rocking movement substantially in the cutting plane of the saw whereby the cutting surfaces are alternately rocked into and out of cutting engagement with the stone at the beginning of successive saw blade strokes, the rocking of a cutting surface out of cutting engagement at the beginning of a stroke being sufficient to remove such edge from contact with the stone.

References Cited in the file of this patent
UNITED STATES PATENTS

| | | |
|---|---|---|
| 108,425 | Young | Oct. 18, 1870 |

FOREIGN PATENTS

| | | |
|---|---|---|
| 507,422 | Italy | Dec. 30, 1954 |
| 534,489 | Italy | Oct. 17, 1955 |
| 655,084 | Germany | Jan. 7, 1938 |